D. JEWETT.
CAR AXLE BOX.
No. 78,210. Patented May 26, 1868.
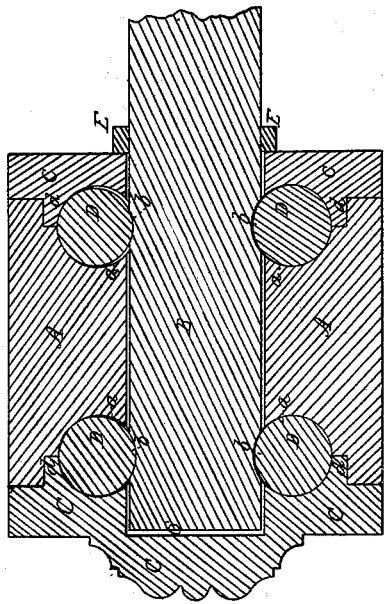
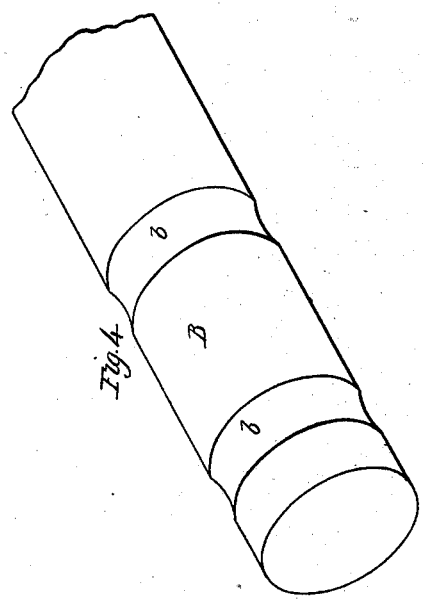
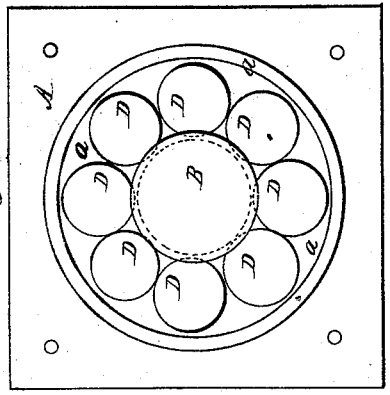
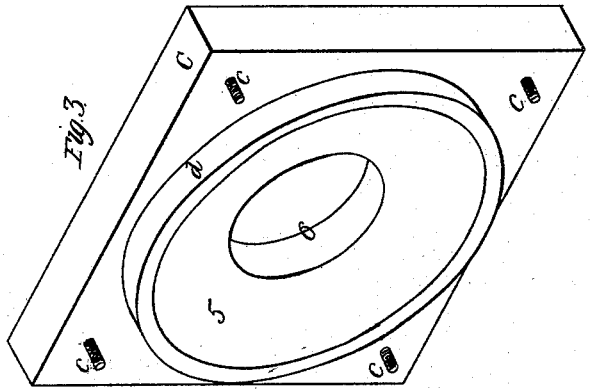
Witnesses:
Inventor:
David Jewett

United States Patent Office.

DAVID JEWETT, OF LYNN, MASSACHUSETTS, ASSIGNOR TO HIMSELF AND ALBERT LEACH, OF SAME PLACE.

*Letters Patent No. 78,210, dated May 26, 1868.*

---

IMPROVED AXLE-BOX FOR RAILROAD-CARS.

---

*The Schedule referred to in these Letters Patent and making part of the same.*

---

TO ALL WHOM IT MAY CONCERN:

Be it known that I, DAVID JEWETT, of Lynn, in the county of Essex, and State of Massachusetts, have invented an Improved Journal or Axle-Box for Railroad-Cars, Carriages, Shafting, &c., of which the following is a full, clear, and exact description, reference being had to the accompanying drawings, making part of this specification, in which—

Figure 1 is an end elevation of a journal-box, having my improvements applied thereto, the cap-plate at this end being removed to show the interior construction.

Figure 2 is a longitudinal section through the centre of my improved journal-box.

Figure 3 is a view of one of the cap-plates detached.

Figure 4 is a view of the journal.

My invention consists in a journal or axle-box, provided with a series of spherical balls, which are placed in a circular recess or chamber, and revolve in contact with the journal or axle, thereby reducing the friction to a great extent, and entirely avoiding the necessity of employing oil or other lubricating-material To enable others skilled in the art to understand and use my invention, I will proceed to describe the manner in which I have carried it out.

In the said drawings, A represents the journal-box of a railroad-car, which is of a rectangular form, and is bored out at the centre for the reception of the journal B.

Within each end of the box, A, is formed an annular recess, $a$, which is rounded or curved, as seen in the drawings, and when covered by a plate or cap, C, provided with a similar recess, 5, forms a chamber for the reception of a series of spherical balls, D, composed of steel or other suitable material, which revolve in contact with the journal B, and the interior surface of the chamber, a portion of each ball resting in a groove, $b$, in the journal B, the curvature of the groove corresponding to that of the balls D.

The journal, B, is thus caused to bear directly upon the balls D, and is supported thereby at each end of the box A, without coming into immediate contact with its interior surface, by which means the friction is reduced to a great extent, so that a car or carriage may be moved with great ease, and with much less power than where the ordinary journal-box is employed, while no oil or other lubricating-material is required, thus effecting a great saving, and rendering it easy to keep the parts clean and free from dirt.

The cap-plates, C, are secured in place by means of screws, $c$, and are each provided with a flange or projection, $d$, which fits into the recess $a$. Instead of the screw $c$, however, the flange $d$ may be provided with a screw-thread, fitting into a corresponding screw-thread on the inner surface of the recess $a$.

The outer end of the journal, B, revolves in a circular cavity, 6, in the outer plate, C, and passes entirely through the opposite plate, a collar, E, of rubber, or other suitable material, serving to exclude the dirt and dust from the interior of the box A, and the ordinary metal collar at this point being dispensed with.

The axle or journal, B, is held in place within the box A, by means of the balls D, which, as before stated, fit into the grooves $b$, and prevent it from being withdrawn until they are removed from their chambers; thus dispensing with the ordinary screw-nut, or other device, at present used for this purpose.

In the foregoing description, I have spoken of two chambers, each containing a series of spherical balls, but it is evident that the journal may rest on a single series of balls, or on more than two series, if preferred.

My invention may be applied to journal-boxes for machine-shafting as well as to those for railroad-cars, and also to the axle-boxes of carriage-wheels, without departing from the spirit of my invention.

I am aware that car-axle boxes have been provided with spherical balls revolving in a groove formed in a sleeve which is keyed to the shaft, and hence I disclaim the arrangement as found in the patent of Joel Webster, dated June 18, 1861. I avoid altogether the use of the sleeve, which thus simplifies and cheapens the axle-boxes; and to secure a steady motion I use a double set of the spherical balls in each box.

Claim.

What I claim, and desire to secure by Letters Patent, is—

The construction and arrangement of an axle-box, when composed of the parts C C, A A, and combined with the rollers D D and grooved axle B, in the manner and for the purpose herein described.

DAVID JEWETT.

Witnesses:
P. E. TESCHEMACHER,
N. W. STEARNS.